United States Patent
Campbell et al.

(10) Patent No.: US 11,422,947 B2
(45) Date of Patent: Aug. 23, 2022

(54) DETERMINING PAGE SIZE VIA PAGE TABLE CACHE

(71) Applicant: International Business Machines Corporation, Armonk, NY (US)

(72) Inventors: David Campbell, Austin, TX (US); Jake Truelove, Austin, TX (US); Charles D. Wait, Byron, MN (US); Jon K. Kriegel, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/991,075

(22) Filed: Aug. 12, 2020

(65) Prior Publication Data

US 2022/0050792 A1 Feb. 17, 2022

(51) Int. Cl.
*G06F 12/1045* (2016.01)
*G06F 12/1027* (2016.01)
*G06F 12/1009* (2016.01)

(52) U.S. Cl.
CPC ...... *G06F 12/1045* (2013.01); *G06F 12/1009* (2013.01); *G06F 12/1027* (2013.01); *G06F 2212/305* (2013.01); *G06F 2212/652* (2013.01); *G06F 2212/68* (2013.01)

(58) Field of Classification Search
CPC ............. G06F 12/1009; G06F 12/1027; G06F 12/1045; G06F 12/1072; G06F 2212/305; G06F 2212/50; G06F 2212/652; G06F 2212/68
USPC ........................................................ 711/205
See application file for complete search history.

(56) References Cited

U.S. PATENT DOCUMENTS

| | | | | |
|---|---|---|---|---|
| 6,226,722 B1* | 5/2001 | Shippy | ................ | G06F 12/0884 711/E12.043 |
| 6,427,188 B1* | 7/2002 | Lyon | ................... | G06F 12/0897 711/E12.043 |
| 8,694,712 B2 | 4/2014 | Sheu et al. | | |
| 9,104,594 B2 | 8/2015 | Cohen et al. | | |
| 9,348,522 B2 | 5/2016 | Busaba et al. | | |
| 2008/0147977 A1* | 6/2008 | Toussi | ................. | G06F 12/0897 711/E12.043 |
| 2009/0172344 A1* | 7/2009 | Grochowski | ......... | G06F 12/145 711/207 |
| 2012/0102269 A1* | 4/2012 | Ono | .................... | G06F 12/0862 711/E12.024 |
| 2013/0262817 A1* | 10/2013 | Bybell | ................ | G06F 12/1027 711/208 |

(Continued)

OTHER PUBLICATIONS

Rachata Ausavarungnirun, Joshua Landgraf, Vance Miller, Saugata Ghose, Jayneel Gandhi, Christopher J. Rossbach, and Onur Mutlu. 2018. Mosaic: Enabling Application-Transparent Support for Multiple Page Sizes in Throughput Processors. SIGOPS Oper. Syst. Rev. 52, 1 (Jul. 2018), 27-44. (Year: 2018).*

(Continued)

*Primary Examiner* — Reginald G Bragdon
*Assistant Examiner* — Aaron D Ho
(74) *Attorney, Agent, or Firm* — Alex Harvey

(57) ABSTRACT

A page directory entry cache (PDEC) can be checked to potentially rule out one or more possible page sizes for a translation lookaside buffer (TLB) lookup. Information gained from the PDEC lookup can reduce the number of TLB checks required to conclusively determine if the TLB lookup is a hit or a miss.

20 Claims, 6 Drawing Sheets

(56) References Cited

U.S. PATENT DOCUMENTS

| | | | | |
|---|---|---|---|---|
| 2015/0378731 | A1* | 12/2015 | Lai | G06F 9/3824 |
| | | | | 712/30 |
| 2017/0262381 | A1* | 9/2017 | Swaine | G06F 12/1009 |
| 2018/0046583 | A1* | 2/2018 | Bybell | G06F 12/128 |
| 2018/0232316 | A1* | 8/2018 | Mirza | G06F 12/1009 |
| 2019/0155748 | A1* | 5/2019 | Sandberg | G06F 12/109 |
| 2020/0097413 | A1* | 3/2020 | Raval | G06F 12/1045 |
| 2020/0257635 | A1* | 8/2020 | Park | G06F 12/1036 |

OTHER PUBLICATIONS

J. Y. Hur and J. Kong, "Page Table Compaction for TLB Coalescing," in IEEE Access, vol. 8, pp. 104814-104829, 2020, doi: 10.1109/ACCESS.2020.2999926. (Year: 2020).*

F. Guvenilirand Y. N. Patt, "Tailored Page Sizes," 2020 ACM/IEEE 47th Annual International Symposium on Computer Architecture (ISCA), 2020, pp. 900-912, doi: 10.1109/ISCA45697.2020.00078. (Year: 2020).*

Levine, "Linkers & Loaders," Jun. 30, 1999, 299 pages.

Karakostas, "Improving the Performance and Energy-efficiency of Virtual Memory," A Range-based Approach, Dissertation, Apr. 2016, 172 pages.

"Predictive address translation prefetch for units using an Address translation caching mechanism," IP.Com, An IP.com Prior Art Database Technical Disclosure, IP.com No. IPCOM000245589D, IP.com Electronic Publication Date: Mar. 21, 2016, 2 pages.

IBM, "Decreased Latency Across PCI Express With I/O Virtualization Via a Hint Interface," IP.Com, An IP.com Prior Art Database Technical Disclosure, Original Publication Date: Jul. 16, 2009, IP.com No. IPCOM000185226D, IP.com Electronic Publication Date: Jul. 16, 2009, 3 pages.

* cited by examiner

DETERMINING PAGE SIZE VIA PAGE TABLE CACHE

BACKGROUND

Many modern computer architectures utilize virtual memory, preventing software from "knowing" which physical memory addresses are allocated to the software. Thus, if software wishes to access memory, it provides a virtualized memory address which must then be translated into the real physical address. Many systems include a translation lookaside buffer (TLB), effectively serving as a cache of recently translated addresses, providing a chance for the address translation to be performed relatively quickly.

Systems frequently utilize a memory storage architecture including "pages," essentially tables stored in long-term storage that map virtualized addresses to real addresses. Pages may be of different sizes and have different levels (pages may map to lower-level pages).

Virtual addresses typically include an "offset" (usually a group of the least-significant bits). The size of the offset (how many bits) depends upon the page size. Different systems may utilize different page sizes, and in order to translate an address, a system must determine the offset (including knowing how many bits are offset bits). If a system attempts to look up a translation in a TLB, it will need to try every possible page size (as trying an incorrect page size will fail).

SUMMARY

Some embodiments of the present disclosure can be illustrated as a method. The method includes receiving a request including a virtual address. The method further includes identifying a set of possible page sizes. The method further includes performing a Page Directory Entry Cache (PDEC) lookup based on the virtual address. The method further includes updating the set of possible page sizes based on the PDEC lookup. The method further includes performing a Translation Lookaside Buffer (TLB) lookup based on the set of possible page sizes.

Some embodiments of the present disclosure can also be illustrated as a computer program product comprising a computer readable storage medium having program instructions embodied therewith, the program instructions executable by a computer to cause the computer to perform the method discussed above.

Some embodiments of the present disclosure can be illustrated as a system. The system may comprise memory and a processing unit, such as a controller or a central processing unit (CPU). The processing unit may be configured to execute instructions to perform the method discussed above.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure. Features and advantages of various embodiments of the claimed subject matter will become apparent as the following Detailed Description proceeds, and upon reference to the drawings, in which like numerals indicate like parts, and in which:

Figure 1:
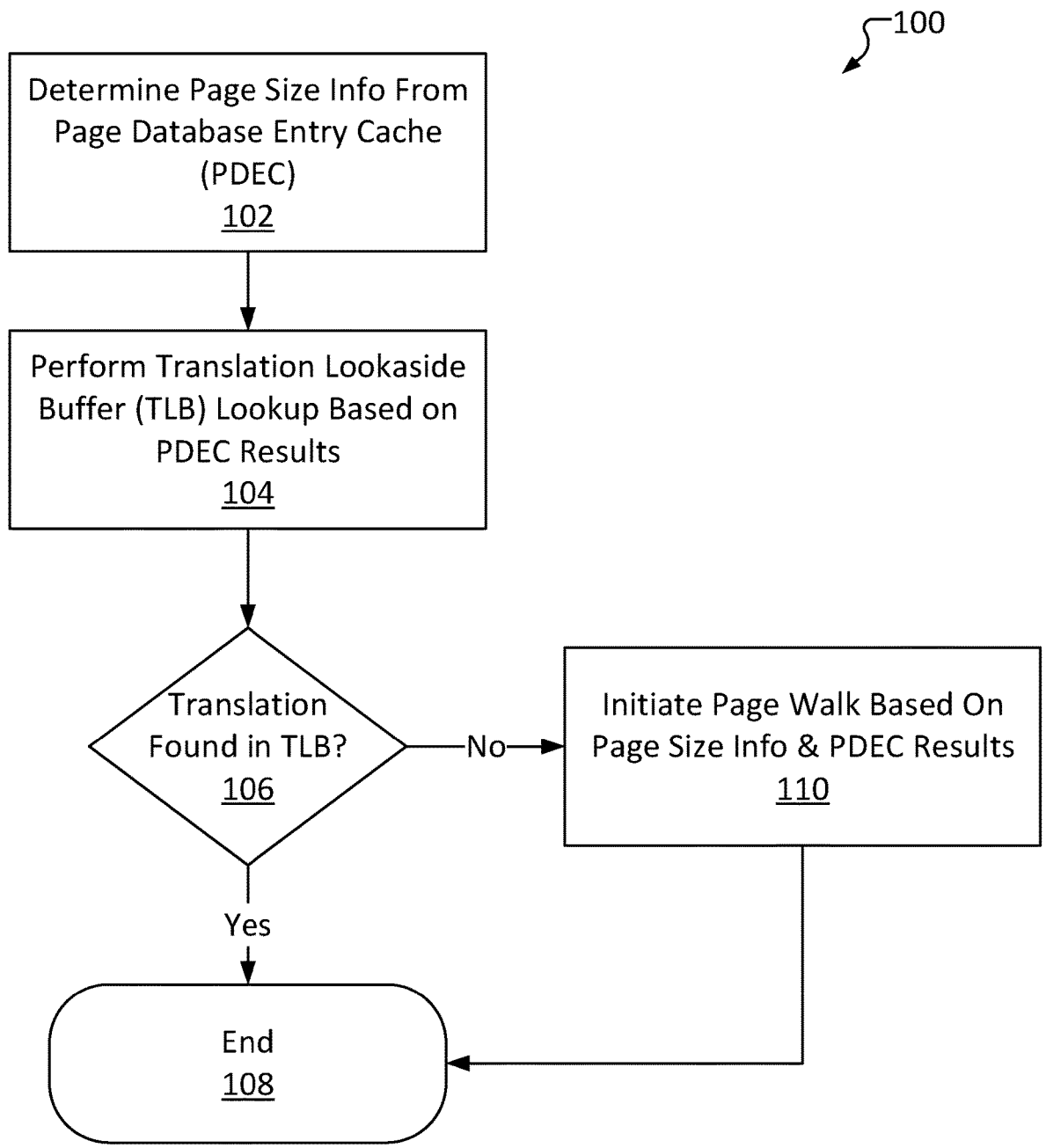
FIG. 1 illustrates a high-level virtual memory translation method leveraging information from a page directory entry cache (PDEC), consistent with several embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to systems and methods to determine a page size. More particular aspects relate to a system to receive a virtual address, access a page directory entry cache (PDEC) and a translation lookaside buffer (TLB), and determine, based on the accesses, a page size.

This disclosure relates to virtual memory schemes, under which programs executing on a system utilize their own addressing system which is then translated (by the system) to enable the programs to access and utilize data without "knowing" the actual physical addresses in RAM that the data is stored at. For example, if a program needs to read data, it submits a read request identifying a "virtual address" (or "VA," the address at which the program "thinks" the requested data is stored). The system receiving the request translates the virtual address to a "real address" (or "RA," the actual location in memory at which the data is stored, also known as a "physical address"). Virtual memory regimes provide significant advantages over conventional approaches and are nearly ubiquitous in modern computing systems.

Throughout this disclosure, reference is made to "page tables." As used herein, a page table refers to a data structure mapping virtual addresses to physical addresses. Page tables map ranges ("pages") of virtual addresses to physical addresses; this advantageously reduces memory footprint by reducing the number of entries required in the table. The extent of this benefit depends (in part) upon the size of the ranges, also known as the "page size." In general, the larger the page size, the less memory required to store the page table. However, as larger page sizes also reduce granularity of memory distribution, there can be performance tradeoffs. Virtual memory systems generally cannot store a portion of a page; entire pages are stored or evicted. Thus, with larger page sizes, more data must be read and written if a page walk is necessary. Further, evicting a large page relinquishes easy access to more address mappings than evicting a smaller page.

Many systems attempt to reap the benefits of larger page sizes while mitigating the drawbacks by implementing multiple "tiers" or "levels" of paging. "Page directories" function similarly to page tables, except instead of mapping to physical addresses, page directories map to lower-level page tables. This enables additional memory savings by allowing a system to store much of the paging system in long-term storage ("on disk"), but the lower-level page tables have a smaller page size, mitigating many of the drawbacks (granularity, etc.) associated with larger page sizes.

Some systems may use more than two levels of page directories and tables, organized into a "translation tree." For example, a Radix translation tree might include four levels of translation, denoted L1, L2, L3 and L4. Each level includes a number of pages, where each page includes a list of indexed "entries." If the page is a page directory, its entries (referred to herein as "page directory entries" or "PDEs") may include a pointer to a lower-level page. This lower-level page may itself be a page table or another page directory. Thus, upon receiving a virtual address, a system may look up the VA in a first-level (L1) page directory based on a first index. The PDE of the L1 page directory may indicating which of a number of second-level (L2) pages (which are often additional lower-level page directories) to search next. The PDE at a second index of the L2 page directory may indicate an L3 page, and the L3 entry (selected based on a third index) may point to a last L4 page table. The appropriate page table entry ("PTE"), identified based on a fourth index, may indicate a page of physical addresses. The actual physical address is selected from the page based on an offset (also included in the virtual address). Multi-level page tables generally reduce memory footprint, but as they typically require additional translations for each address, they may come with a performance tradeoff.

Notably, many multi-level page table systems allow for flexibility in terms of the data structure stored at each level (and even within the same level). For example, within a given system, a first L4 page structure may be a page table mapping virtual addresses to 4 kilobyte (kB) pages, while a second L4 page structure may be a page table mapping virtual addresses to 64 kB pages. As another example, a first entry of an L2 page directory may be a PDE mapping a virtual address to an L3 page table of 2 Megabyte (MB) pages, while a second L2 PDE may point to an L3 page directory (which in turn points to L4 page tables with smaller page sizes). Thus, different virtual addresses may be translated to physical addresses grouped into pages of different sizes. In other words, a first virtual address may translate to a first physical address included within a 2 MB page, while a second virtual address may translate to a second physical address included within a 4 kB page. This variety in page sizes can result in slowdowns related to translation lookaside buffer (TLB) lookups, as will be described in further detail below.

Throughout this disclosure, reference is made to "TLB lookups." As used herein, a "TLB lookup" refers to checking a TLB to determine whether the TLB includes a particular translation. If the translation is included in the TLB, this is a TLB "hit," while if the translation is not included in the TLB, this is a TLB "miss." Notably, in some instances, a TLB check will not enable a system to conclusively determine whether the translation is included in the TLB or not. In particular, if the TLB check is performed with an incorrect page size, the check will fail even if the translation actually is in the TLB (just with a different page size). Thus, a "TLB lookup," as used herein, includes checking the TLB as many times as necessary to conclusively determine whether the TLB contains the translation or not.

A "TLB check," as used herein, refers to a TLB access performed as part of a TLB lookup. Each check includes accessing the TLB assuming a given page size. A lookup will iterate through possible page sizes, checking the TLB for the translation assuming each page size until either the translation is found (a TLB hit) or checks have been performed for all possible page sizes supported by the memory architecture without finding the translation (a TLB miss). Thus, a TLB lookup may consist of a single check (if only one page size is possible or if the first page size checked results in a hit) or a plurality of checks, with a maximum number of checks equal to the number of possible page sizes. Because a TLB lookup may require performing a check for each possible page size, resource costs (power, time, etc.) of TLB lookups generally scale with the number of possible page sizes.

As an example, within a given system, a first L2 entry may be a page directory entry (PDE) with a 2 MB page size pointing to one of a number of L3 entries to search next, while a second L2 entry in the same system (i.e., in the same translation tree) may be a page table entry (PTE) directly mapping to the physical address.

A virtual address has several components: indices and an offset. The indices are utilized to walk the translation tree itself in order to find the page of physical addresses, then the offset is utilized to determine which actual physical address within the page of physical addresses is correct. Each index of the address corresponds to a level of the translation tree, while the remaining bits are used as the offset. In general, the size of the page of physical addresses dictates the range of offsets (and thus controls how many bits of the address must be utilized for the offset). For example, a 4 kB page includes 4096 entries (assuming each entry is 1 byte). Thus, in order to be able to describe any particular entry within the 4 kB page, an address must include a 12-bit offset. On the other hand, a 64 kB page includes 16 times as many entries, requiring the offset to include 4 additional bits.

Throughout this disclosure, reference is made to a "page walk." As used herein, a page walk refers to accessing a page table or page directory (e.g., a mapping of address translations stored in long-term storage). Page walks may be performed in order to obtain a real address corresponding to an effective address. As page walks are slow, many systems will only perform a page walk after a translation lookaside buffer (TLB) lookup has missed.

Throughout this disclosure, reference is made to a page directory entry cache (PDEC). As used herein, a PDEC refers to a cache of page directory entries (PDEs) from a page table. In other words, while a paged memory system's page table is stored in long-term storage, a PDEC includes a portion of the page table (such as a range of addresses) for quick access. PDECs can be used to indicate if a translation of a particular address is within the cached range of the page table, allowing a system to perform a table walk faster (by reducing the range of the page table that needs to be walked, or scanned). PDECs are generated upon performing a page walk; in general, when a page walk is performed, PDEs detected during the walk are cached in the PDEC. On the other hand, the final PTE of the page walk is cached in a TLB. Thus, the PDEC could be considered to cache the "path" taken through the translation tree, while the TLB caches the final translation step including the physical address.

FIG. 1 illustrates a high-level virtual memory translation method 100 leveraging information from a page database entry cache (PDEC), consistent with several embodiments of the present disclosure. Method 100 may be performed by a computer system implementing a virtual memory architecture including a TLB and a PDEC.

Method 100 includes determining page size information from a page directory entry cache (PDEC) at operation 102. Operation 102 may be performed in response to receiving a request including a virtual address (or effective address) to be translated to an actual (or real) address. Operation 102 may include analyzing the PDEC and/or performing a PDEC lookup. For example, in some embodiments, operation 102 may include identifying a page directory entry (PDE) and further identifying a level of the PDEC including the PDE. This information (knowledge of which level of the PDEC includes the PDE) can be leveraged to rule out page sizes in a set of possible page sizes. For example, if the PDEC lookup returns a second-level PDE (in an L2) of the PDEC, this can be interpreted to mean that a radix tree corresponding to the cached translation has greater than two levels, indicating that the page size is smaller than the L1 and L2 page sizes. If it were a PTE, the resulting caching of the PTE would be placed in the TLB and not the PDEC.

In some embodiments, operation 102 includes performing a lookup of the virtual address in the PDEC. In one example, the set of possible page sizes has entries including 1 Gigabyte (GB), 2 Megabytes (MB), 64 kilobytes (kB) or 4 kB (one of which is "correct," meaning the real address is stored in a page of one of these sizes). In such an example, operation 102 may include a processor reading from the PDEC as if the page size were 4 kB. If none of the translation tree's cached PDEs are "relevant" (meaning no steps of the translation path of the virtual address associated with the processor are included within the PDEC), the lookup will fail (a "miss") and no page sizes can be ruled out of the TLB lookup. A hit in the PDEC can reveal information to the processor about page sizes included in the translation. At the very least, it can enable the processor to rule out one or more page sizes, but depending upon how many steps of the translation are included in the PDEC, in some situations a PDEC hit can directly inform the processor of the correct page size. This can advantageously allow a system performing method 100 to reduce a number of required TLB accesses before concluding that a page walk is necessary.

In some embodiments, a set of possible page sizes can be ordered based upon likelihood. This ordering may be based on, for example, page size (larger page sizes first), knowledge of the architecture (for example, 64 kB pages may be technically possible but known to be rare), etc. In some embodiments, a TLB lookup may be performed based on likelihood of possible page sizes as well as page size information gained from a PDEC lookup. For example, if a 4 kB page size is more likely than a 64 kB page size, which in turn is more likely than a 2 MB page size, and the 4 kB page size is ruled out, a TLB lookup may be performed based on the most likely page size of the set of possible page sizes (in this example, a first check of the TLB lookup may assume a 64 kB page size).

Method 100 further includes performing a lookup in a translation lookaside buffer (TLB) based on PDEC lookup results at operation 104. Operation 104 includes performing at least one TLB check. When checking a TLB, a format of the address submitted to the TLB can change depending upon page size. Put differently, checking a TLB (during a TLB lookup) based on an incorrect page size can be essentially guaranteed to fail as if the translation were not in the TLB. Thus, if a page size of an address is unknown because there are multiple possible page sizes, an unsuccessful TLB check does not guarantee that the translation is actually absent from the TLB; a first check of the lookup may have simply assumed an incorrect page size. Therefore, with some incorrect page sizes ruled out thanks to operation 102, operation 104 includes performing a TLB lookup with a greater chance of definitively determining whether the requested address is actually within the TLB with each check. The nature of the TLB lookup itself may be performed in a manner similar to typical usage of TLBs in the art. In some embodiments, operation 104 may be performed at least partially contemporaneously with operation 102; for example, a processor may be configured to perform operations 102 and 104 in parallel.

Method 100 further includes determining whether the TLB lookup resulted in a hit at operation 106. Operation 106 may include iterating a set of possible page sizes, performing a TLB check until either the requested translation is found (a TLB hit) or all page sizes have been checked. If the TLB lookup is a hit (106 "Yes"), the system performing method 100 retrieves the translated address (as normal) and method 100 ends at operation 108.

If a TLB check fails, operation 106 may include, for example, determining whether possible page sizes remain unchecked. If so, operation 106 further includes performing an additional TLB check based on one of the remaining possible page sizes.

In such embodiments, if the TLB check of operation 104 fails but the PDEC lookup of 102 hits (assuming both utilized the same page size), then the page size is correct but the TLB does not contain the desired translation, so a page walk is necessary (a TLB miss, 106 "No"). Rather than needing to check the TLB using every possible page size, a system performing method 100 may be able to determine that a page walk is necessary after a single TLB check. Notably, even after performing operation 102, a single TLB check may not always be sufficient to conclusively determine whether a page walk is necessary; if both the PDEC lookup misses and the TLB check fails, then the page size may still be unknown. Further, even if the PDEC lookup hits, a set of possible page sizes may be reduced, but still contain more than one possible page size. In other words, a PDEC lookup hit enables reducing the size of the set of possible page sizes, therefore reducing the maximum number of TLB checks necessary for the TLB lookup. This advantageously reduces the resource costs of the TLB lookup.

If all of the set of page sizes have been checked without locating the requested translation, the TLB lookup is a miss (106 "No"). In the case of a TLB miss, method 100 further includes initiating a page walk at operation 110. In some embodiments, operation 110 may include leveraging information gained from the PDEC lookup(s) to gain a "head start" for the page walk (discussed in further detail with reference to FIG. 2, below). Method 100 then ends at 108.

Figure 2:
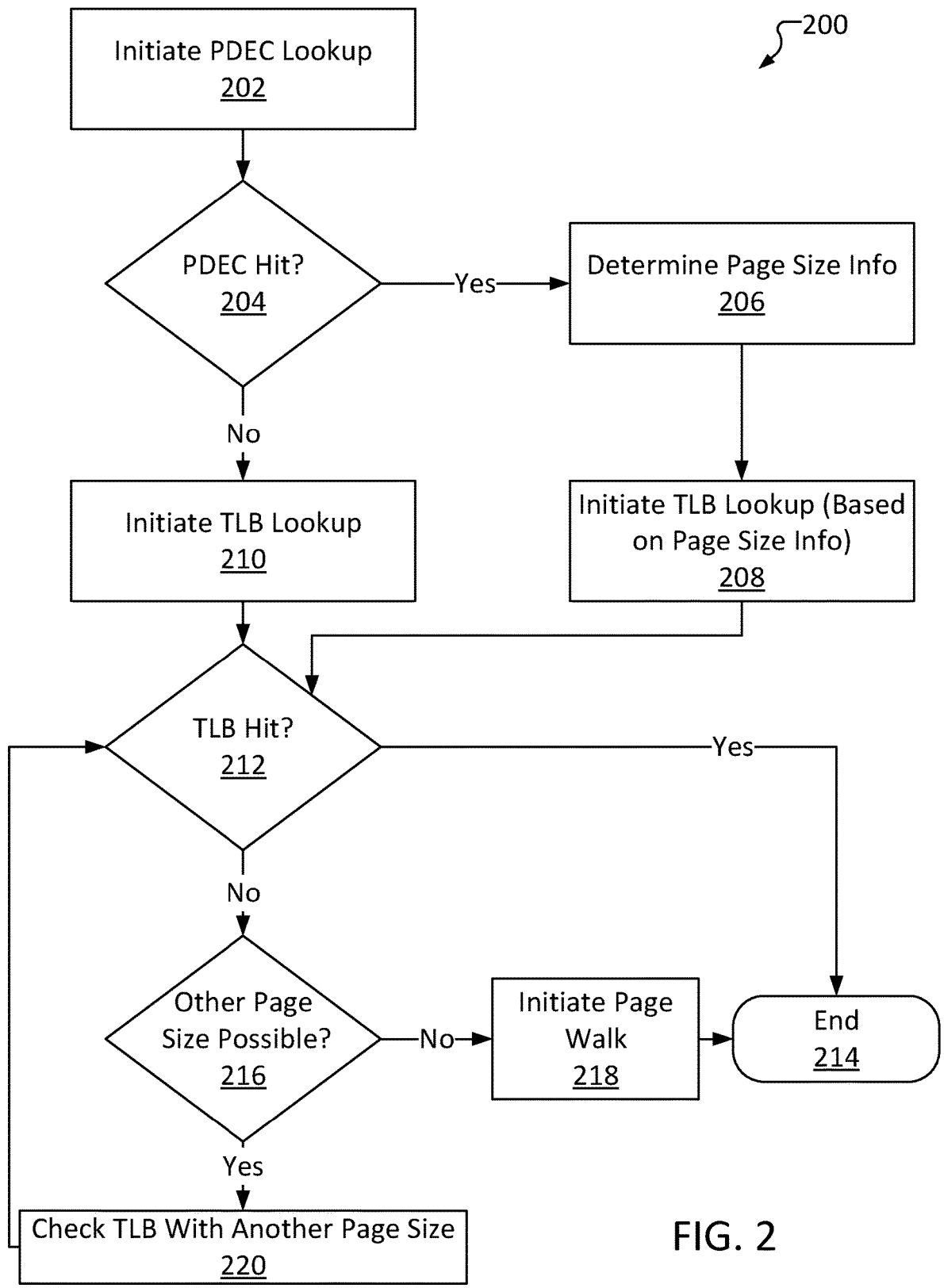
FIG. 2 illustrates an example virtual memory translation method leveraging information from a page directory entry cache (PDEC) in additional detail, consistent with several embodiments of the present disclosure.

FIG. 2 illustrates an example virtual memory translation method 200 leveraging information from a page database entry cache (PDEC) in additional detail, consistent with several embodiments of the present disclosure. Method 200 may be performed by a computer system in response to receiving a request (such as a read or write request) including a virtual address to be translated. The virtual address's corresponding physical address can be determined by walking a translation path (a page walk), but the final stage of the path indicating the desired physical address may already be cached in a translation lookaside buffer (TLB). Since accessing the TLB can be orders of magnitude faster than a page walk, method 200 may be performed to determine whether the page walk is necessary.

Method 200 includes initiating a PDEC lookup at operation 202. Operation 202 may include, for example, submitting the virtual address to a PDEC to determine whether one or more steps of the translation path are cached within the PDEC. While the PDEC does not store physical addresses (so a TLB lookup will be necessary regardless of the contents of the PDEC), the information stored in the PDEC can aid in reducing a number of redundant TLB checks of the lookup.

Method 200 further includes determining whether the PDEC lookup resulted in a hit at operation 204. A PDEC hit indicates that at least one step of the translation path of the virtual address is cached within the PDEC and returns the lowest-level page directory entry (PDE) of the cached translation path in the PDEC. Notably, the extent of the path cached within the PDEC can vary between hits. For example, the PDEC may only include a single step (e.g., may include the L1 PDE pointing to an L2 page to search, but may not include the relevant L2 page), or the PDEC may include every step of the translation except the physical address page itself (e.g., may include the L1 PDE pointing to an L2 page directory, the L2 PDE pointing to an L3 PD, and the L3 PDE pointing to an L4 page table, although the L4 PTE itself may be stored in the TLB, not the PDEC).

If no steps of the translation path are cached within the PDEC (204 "No"), method 200 further includes initiating a TLB lookup at operation 210. Operation 210 may include performing a first TLB check with an assumed a page size. Operation 210 may generally be performed using standard methodologies as will be understood by one of ordinary skill in the art.

However, in response to a PDEC hit (204 "Yes"), method 200 further includes determining page size information at operation 206. Operation 206 may include, for example, analyzing results of the PDEC hit to determine if any page sizes can be ruled out as possibilities. For example, in some embodiments, L2 pages are 1 GB, L3 pages are 2 MB and L4 pages may be either 64 kB or 4 kB. Therefore, a set of possible page sizes includes 1 GB, 2 MB, 64 kB and 4 kB. If a PDEC hit returns an L2 PDE, this implies that the L2 page is not the final step of the translation path. Thus, operation 206 may include ruling out the possibility of the page size being 1 GB, reducing the set of possible page sizes to only three options: 2 MB, 64 kB and 4 kB. Any of these three page sizes are still possible, because the PDEC did not include enough information to rule any of them out. If, however, the PDEC hit returns an L3 PDE, then the 2 MB page size can be ruled out as well for similar reasons, reducing the set of possible page sizes to 64 kB and 4 kB.

Notably, a PDEC hit may also include one or more page size indicator bits, or "hint bits." These bits may be added to the PDEC as the PDEC is generated/updated, as will be discussed in further detail below with reference to FIG. 3. A hint bit may be included to indicate which of two possible next-level page sizes is correct. For example, an L3 page directory may point to a number of L4 page tables. Some of the L4 page tables may be 64 kB page tables, while others may be 4 kB. A specific L3 PDE (pointing to one particular L4 page table) may include a hint bit to indicate the correct size of the L4 page table.

As a clarifying example, an L3 PDE may point to L4 page table "X." Without any hint bits, a system performing a TLB lookup will essentially need to iterate through the set of possible page sizes [4 kB, 64 kB] of table X. If X is a 64 kB page table and a system attempts to search X as if it were a 4 kB page table, the search will fail, regardless of contents of X. Thus, if a check of X fails, the system cannot know if the TLB lookup is a miss or not, because the failed check could be a result of guessing the page size of X incorrectly instead of a result of X actually not including the translation in question. To mitigate this, the L3 PDE may include a hint bit with a value of "1," which the system interprets to mean the L4 page table (X) is a 4 kB page table. This way, if the check of X fails, the system can confidently declare the overall TLB lookup a "miss" and move on to a page walk instead of wasting time/power performing additional checks of X with other page sizes. Thus, operation 206 may include determining page size information based on reading one or more bits.

In some embodiments, operation 206 may include determining a sole possible page size based on a hint bit of a "penultimate"-level PDE. For example, in a 4-level paging system, if an L3 PDE includes a hint bit indicating that an L4 page is 4 kB, operation 206 may include selecting 4 kB as the page size.

In some embodiments, translation trees may include more (or fewer) possible page sizes and/or levels. Page size indicators can be implemented as needed at any level. For example, if a page tree could include 2 MB L2 page tables, 3 MB L2 page tables, or 4 MB L2 page directories, a PDEC may include L1 page size indicators to indicate whether an L2 page table is 2 MB or 3 MB (and an absence of an indicator in an L1 PDE may indicate that the next level is a page directory). If more than two page sizes are possible at the next level, more than one bit may be included as appropriate.

After determining page size information, method 200 further includes initiating a TLB lookup at operation 208 leveraging the information obtained from the PDEC hit. Operation 208 may be substantially similar to operation 210, but with the assumed page size of the first TLB check selected from a smaller set of possible page sizes. In some embodiments, if operation 206 eliminates all but one possible page size, operation 208 may include selecting the identified page size and performing a TLB lookup based on the page size.

Once a TLB check is initiated (whether via operation 210 or operation 208, or even operation 220 as discussed below), method 200 further includes determining whether the TLB check results in a hit (also meaning the overall TLB lookup is a hit) at operation 212. Operation 212 will result in a hit if the desired physical address is contained in the TLB and the check's assumed page size is correct. In the case of a hit (212 "Yes"), method 200 returns the physical address and ends at 214.

If the TLB check fails (212 "No"), method 200 continues iterating through the possible page sizes by determining whether any of the set of possible page sizes have not been attempted at operation 216. Operation 216 may include, for example, removing the page size attempted at operation 212 from the set of possible page sizes and checking if any possible page sizes remain in the set. Operation 216 may be beneficial because the desired physical address may be in the TLB even if the check resulted in a miss; it is possible the assumed page size was incorrect (forcing a failed check regardless of the TLB's contents). Thus, even if the TLB check failed, a page walk (which is orders of magnitude slower than TLB lookups) may still be premature.

If all possible page sizes have been checked (216 "No"), then the system can definitively conclude that the desired translation is not present within the TLB (a TLB miss). Thus, method 200 further includes initiating a page walk at operation 218. Notably, operation 218 can still leverage information gained from a PDEC hit (of 204 "Yes"); the PDEC hit will return a step in the translation path. The page walk of operation 218 can be initiated from that step, allowing a "head start" of sorts in the page walk. Method 200 then ends at operation 214.

If at least one possible page size has not yet been checked (216 "Yes"), method 200 further includes performing another TLB check with another possible page size at operation 220. Operations 220-212-216 essentially iterate through all possible page sizes, performing a TLB check for each until either the TLB hits (212 "Yes") or the set of possible page sizes is exhausted. This loop can be significantly shortened by checking the PDEC; while a PDEC lookup may not change the final result, the operations of method 200 can reduce the number of times operations 216 and 220 must be performed (i.e., the number of TLB checks involved in the TLB lookup), advantageously improving performance of a system executing method 200.

Figure 3:
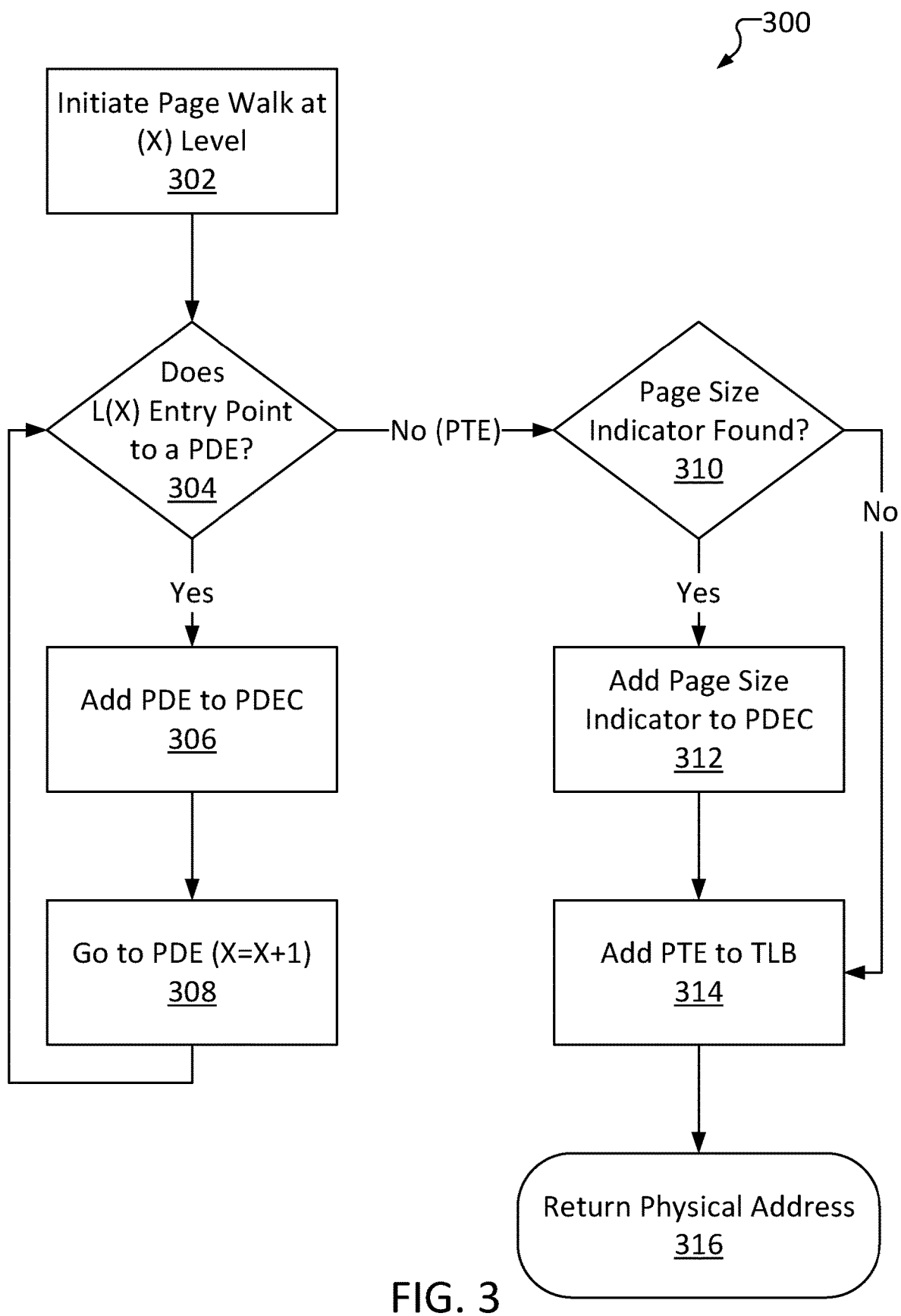
FIG. 3 illustrates an example page database entry cache (PDEC) construction method, consistent with several embodiments of the present disclosure.

FIG. 3 illustrates an example page database entry cache (PDEC) construction method 300, consistent with several embodiments of the present disclosure. Method 300 may be performed during or after a page walk. While the "goal" or purpose of the page walk is to translate a virtual address to a physical address, method 300 may enable reaping additional benefit from the walk by leveraging information gained during the walk to update information included in a cache (the PDEC) of one or more steps of the walk. In general, method 300 includes performing a page walk, adding page directory entries (PDEs) encountered during the page walk to a PDEC, adding the final PTE accessed during the page walk to a translation lookaside buffer (TLB), and adding page size indicator information to the PDEC in the form of one or more "hint bits."

Method 300 includes initiating a page walk at operation 302. The page walk may be initiated at a particular level (e.g., L1, L2, etc.). In general, page walks begin at higher levels (L1), but certain circumstances can enable starting a page walk at a lower level. For example, a PDEC hit can inform a system of one or more steps of a translation path. In such a situation, even if the final translation step is not cached in a TLB (making the page walk necessary), a page walk may be initiated at a lower level based on information gained from the PDEC hit. Operation 302 may include accessing a page entry which may be a page directory entry (PDE) pointing to more page entries or a page table entry (PTE) pointing to a page of physical addresses.

Method 300 further includes determining whether the accessed page entry points to a PDE at operation 304. Operation 304 may include, for example, determining whether the page entry is pointing to a lower-level page entry or to a page of physical addresses. If the page entry is a PDE (304 "Yes"), method 300 further includes adding the PDE to a PDEC at operation 306. Operation 306 may include updating an existing PDEC to reflect the accessed entry as well as what it points to. Method 300 further includes accessing the next-level entry pointed to by the PDE at operation 308. Operation 308 includes performing the next step of a translation, as would be understood by one of ordinary skill in the art. After accessing the next-level entry, method 300 returns to again determine whether the entry is a PDE or a PTE at operation 304. This essentially loops through operations 304-308 until a last-level entry is reached, which is always a PTE. Note that a page walk may immediately encounter PTEs, in which case operations 306 and 308 may not be performed.

Once a PTE is detected (304 "No"), method 300 further includes searching the page entry pointing to the PTE for page size indicator information, such as one or more page size indicator bits, at operation 310. For example, if operation 304 identifies that an L3 PDE is pointing to an L4 PTE, operation 310 may include determining whether the L3 PDE includes a page size indicator, such as a leaf bit. Page size indicators may be included within a PDE pointing to a PTE if the PTE has multiple possible page sizes. For example, an L3 PDE may point to an L4 PTE which may be a 4 kB PTE or a 64 kB PTE; in order to assist a system in performing the correct translation, the L3 PDE pointing to the L4 PTE may include a bit to indicate the page size (sometimes referred to as a "hint bit"), where a "1" indicates that the PTE is 4 kB while a "0" indicates that the PTE is 64 kB.

If a page size indicator is found (310 "Yes"), method 300 further includes adding the page size indicator to the PDEC at operation 312. Operation 312 may include, for example, adding one or more "hint bits" to the PDEC based on the page size indicator. In some embodiments, operation 312 includes copying the page size indicator to the PDEC. In some embodiments, the page size indicator may be added to the PDE (of the PDEC) pointing to the PTE. In some embodiments, the page size indicator could be added to a higher-level PDE in the path, although this may require further identifying information (i.e., more bits) to indicate which PTE the indicator applies to.

If no page size indicator is found (310 "No"), or once a page size indicator has been added at operation 312, method 300 further includes adding the PTE to a translation lookaside buffer at operation 314. Operation 314 may be performed according to typical processes understood by those skilled in the art. Method 300 further includes returning the physical address at operation 316. Operation 316 may include determining the page as indicated by the PTE and adding an offset (included within the virtual address) to determine the requested physical address.

Figure 4:
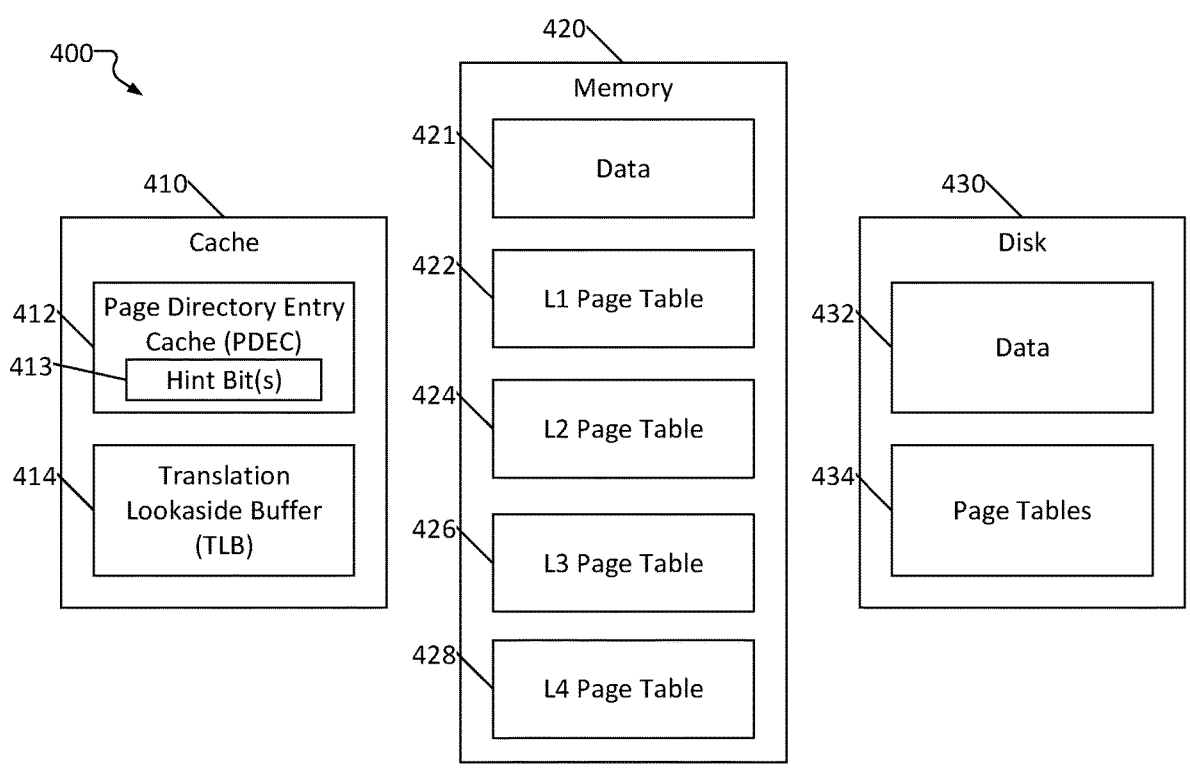
FIG. 4 illustrates a high-level block diagram of an example memory system, consistent with several embodiments of the present disclosure.

FIG. 4 illustrates a high-level block diagram of an example memory system 400, consistent with several embodiments of the present disclosure. System 400 includes cache 410, memory 420 and disk 430. Cache 410 includes a page directory entry cache (PDEC) 412 and a translation lookaside buffer (TLB) 414. In particular, PDEC 412 includes one or more page size indicators such as hint bit(s) 413. When attempting to translate a virtual memory address to a physical memory address, hint bit(s) 413 may be identified during a lookup of PDEC 412. Knowledge gained from hint bit(s) 413 may advantageously reduce a number of checks of TLB 414 required to determine whether or not the desired translation is cached within TLB 414.

Cache 410 may be implemented as a single structure or across multiple components. For example, in some embodiments, cache 410 may comprise a processor cache including PDEC 412 and a memory management unit (MMU) cache including TLB 414. In some embodiments, both PDEC 412 and TLB 414 may be in a MMU cache.

Memory 420 may be utilized by a system including memory system 400 to enable faster access to data 421 than might be provided by disk 430. Memory 420 includes page tables of varying levels, such as L1 page table 422, L2 page table 424, L3 page table 426, and L4 page table 428. As will be understood by those skilled in the art, in some embodiments virtual memory system 400 may utilize more or fewer than 4 levels of paging; L1-L4 is discussed herein merely as an example.

Disk 430 may include long-term storage device such as a hard disk drive, solid state drive, etc. Disk 430 includes data 432 and page tables 434. Notably, some (but not necessarily all) of page tables 434 are stored in memory 420. As an example, a translation may include L1 page table 422 pointing to an L2 page table other than L2 page table 424. In this situation, the appropriate L2 page table must be read from disk (contained in page tables 434).

Figure 5:
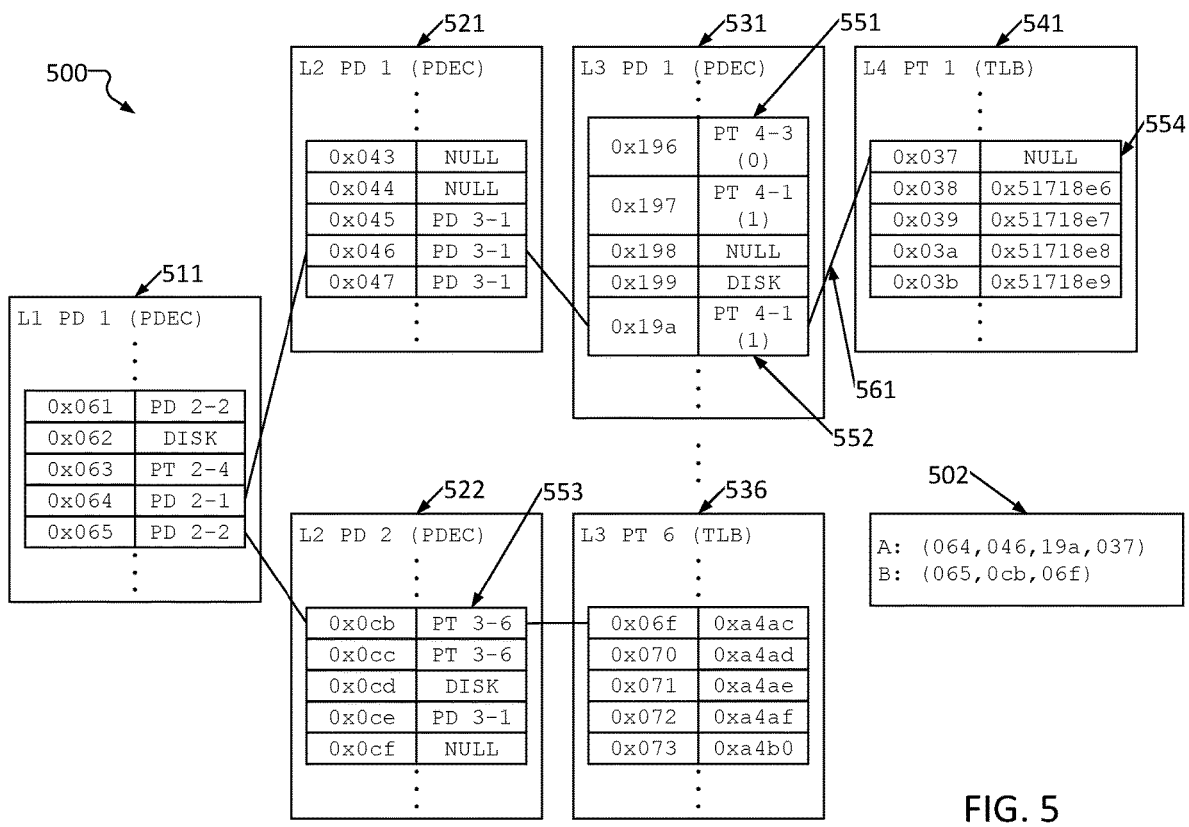
FIG. 5 depicts a block diagram of an example virtual memory architecture 500 depicting translation paths for two example virtual addresses, consistent with several embodiments of the present disclosure.

FIG. 5 depicts a block diagram of an example virtual memory architecture 500 depicting translation paths for two example virtual addresses, consistent with several embodiments of the present disclosure. FIG. 5 depicts page directories 511, 521, 522 and 531 as well as page tables 536 and 541. These page structures are organized by level; 511 is a first L1 PD, 521 is a first L2 PD, 522 is a second L2 PD, 541 is a first L4 page table and 536 is a sixth L3 page table. FIG. 5 also depicts translation paths (such as 561) for two example virtual addresses. As can be seen in box 502, a first example virtual address A may have indices (064, 046, 19a, 037) and a 12-bit offset (not shown in FIG. 5) appropriate for a 4 kB page size. A second example virtual address B may have indices (065, 0cb, 06f) and a 24-bit offset (not shown in FIG. 5) appropriate for a 2 MB page size. Notably, the same virtual address may map to different physical addresses depending upon page size, as bits may be erroneously treated to be offset bits or index bits, changing the translation path.

Each page shown in FIG. 5 maps indices to pointers. For example, index 0x19a of L3 PD 531 has a corresponding page directory entry (PDE) 552 pointing to L4 PT 541. Translation path 561 then shows the path to the next index of virtual address A (0x037) within L4 PT 541. On the other hand, index 0x196 has a corresponding PDE 551 pointing to PT 4-3 (not shown in FIG. 5). Some entries state "DISK," indicating that the corresponding page is known to be on disk (i.e., not in memory). Other entries are "NULL," indicating that the location of the page is not cached in the PDEC or TLB (implying the page may be in memory, but may be on disk).

Virtual memory architecture 500 has two possible L4 PT sizes: 64 kB and 4 kB. Notably, L3 PDEs include page size indicator bits to inform which page size is being pointed to. For example, PDE 552 has a "1" bit, indicating that a first L4 PT 541 is a 4 kB page. In contrast, PDE 551 has a "0" bit, indicating that a third L4 PT is a 64 kB page (not shown in FIG. 5). Further, L3 PT 536 may be a 2 MB page, but as all L3 pages are 2 MB in virtual memory architecture 500, no page size indicator bit is necessary in PDE 553.

As PTE 554 at 0x037 (the last step of example address A's translation) is "NULL," this indicates the TLB does not contain the pointer to the associated page of physical addresses. This means that checking index 0x037 in the TLB will be a miss, and a page walk is necessary. However, had a system checked L4 PT 541 assuming a 64 kB page size instead of the actual 4 kB page size, the TLB still would have missed, but the system would then need to check the 4 kB page size as well before concluding that a page walk was necessary. Systems and method consistent with the present disclosure may advantageously help avoid such a wasted 64 kB TLB check by checking the PDEC and determining page size information (such as through the hint bit in PDE 552) before checking the TLB.

Figure 6:
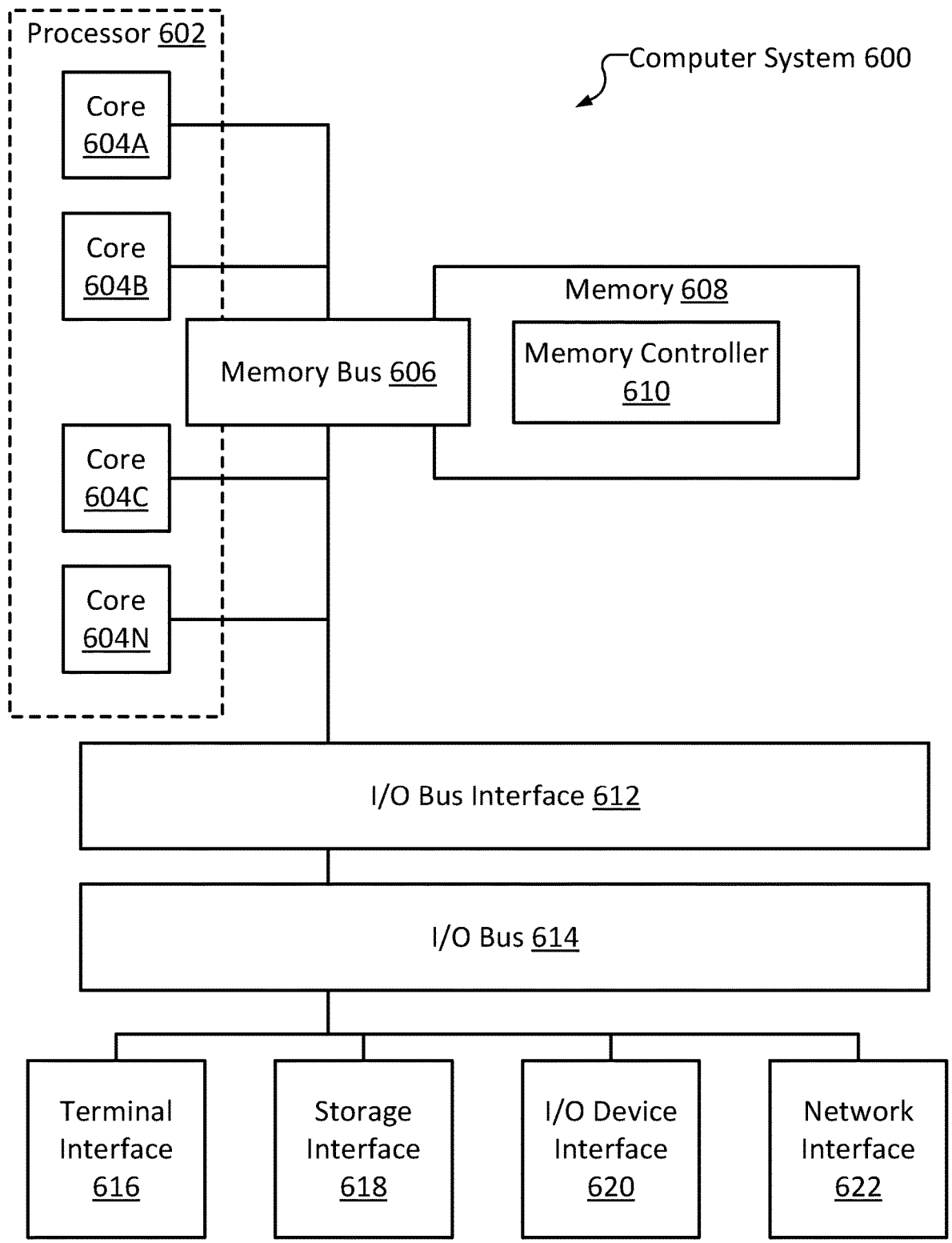
FIG. 6 illustrates a high-level block diagram of an example computer system that may be used in implementing embodiments of the present disclosure.

Referring now to FIG. 6, shown is a high-level block diagram of an example computer system 600 that may be configured to perform various aspects of the present disclosure, including, for example, methods 100, 200 and 300. The example computer system 600 may be used in implementing one or more of the methods or modules, and any related functions or operations, described herein (e.g., using one or more processor circuits or computer processors of the computer), in accordance with embodiments of the present disclosure. In some embodiments, the major components of the computer system 600 may comprise one or more CPUs 602, a memory subsystem 608, a terminal interface 616, a storage interface 618, an I/O (Input/Output) device interface 620, and a network interface 622, all of which may be communicatively coupled, directly or indirectly, for inter-component communication via a memory bus 606, an I/O bus 614, and an I/O bus interface unit 612.

The computer system 600 may contain one or more general-purpose programmable central processing units (CPUs) 602, some or all of which may include one or more cores 604A, 604B, 604C, and 604D, herein generically referred to as the CPU 602. In some embodiments, the computer system 600 may contain multiple processors typical of a relatively large system; however, in other embodiments the computer system 600 may alternatively be a single CPU system. Each CPU 602 may execute instructions stored in the memory subsystem 608 on a CPU core 604 and may comprise one or more levels of on-board cache.

In some embodiments, the memory subsystem 608 may comprise a random-access semiconductor memory, storage device, or storage medium (either volatile or non-volatile) for storing data and programs. In some embodiments, the memory subsystem 608 may represent the entire virtual memory of the computer system 600 and may also include the virtual memory of other computer systems coupled to the computer system 600 or connected via a network. The memory subsystem 608 may be conceptually a single monolithic entity, but, in some embodiments, the memory subsystem 608 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 804 may contain elements for control and flow of memory used by the CPU 602. This may include a memory controller 610.

Although the memory bus 606 is shown in FIG. 6 as a single bus structure providing a direct communication path among the CPU 602, the memory subsystem 608, and the I/O bus interface 612, the memory bus 606 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 612 and the I/O bus 614 are shown as single respective units, the computer system 600 may, in some embodiments, contain multiple I/O bus interface units 612, multiple I/O buses 614, or both. Further, while multiple I/O interface units are shown, which separate the I/O bus 614 from various communications paths running to the various I/O devices, in other embodiments some or all of the I/O devices may be connected directly to one or more system I/O buses.

In some embodiments, the computer system 600 may be a multi-user mainframe computer system, a single-user system, or a server computer or similar device that has little or no direct user interface but receives requests from other computer systems (clients). Further, in some embodiments, the computer system 600 may be implemented as a desktop computer, portable computer, laptop or notebook computer, tablet computer, pocket computer, telephone, smart phone, mobile device, or any other appropriate type of electronic device.

It is noted that FIG. 6 is intended to depict the representative major components of an exemplary computer system 600. In some embodiments, however, individual components may have greater or lesser complexity than as represented in FIG. 6, components other than or in addition to those shown in FIG. 6 may be present, and the number, type, and configuration of such components may vary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method, comprising:
receiving a request, the request including a virtual address;
identifying a set of possible page sizes;
performing, responsive to the receiving, a Page Directory Entry Cache (PDEC) lookup based on the virtual address;
updating, based on the PDEC lookup, the set of possible page sizes; and
performing, responsive to the receiving, a Translation Lookaside Buffer (TLB) lookup based on the virtual address and the updated set of possible page sizes.

2. The method of claim 1, further comprising:
performing a page walk;
identifying page size indicator information based on the page walk; and
updating the PDEC to include a hint bit based on the page size indicator information.

3. The method of claim 2, wherein:
the performing the PDEC lookup includes identifying the hint bit; and
the updating the set of possible page sizes includes removing one or more of the possible page sizes from the set based on the hint bit.

4. The method of claim 3, wherein:
the performing the TLB lookup includes performing a first TLB check with a first page size; and
the method further comprises determining, based on the hint bit, a correct page size, wherein the first TLB check is performed with first page size of the correct page size.

5. The method of claim 1, wherein:
the performing the PDEC lookup includes identifying a level of a returned page directory entry (PDE); and
the updating the set of possible page sizes includes removing one or more of the possible page sizes from the set based on the level.

6. The method of claim 1, wherein the PDEC lookup is performed contemporaneously with the TLB lookup.

7. The method of claim 1, wherein the PDEC lookup is performed before the TLB lookup.

8. A system, comprising:
a memory including instructions; and
a processing unit coupled to the memory, the processing unit configured to execute the instructions to:
receive a request, the request including a virtual address;
identify a set of possible page sizes;
perform, responsive to the receiving, a Page Directory Entry Cache (PDEC) lookup based on a virtual address;
update, based on the PDEC lookup, the set of possible page sizes; and
perform a Translation Lookaside Buffer (TLB) lookup based on the virtual address and the updated set of possible page sizes.

9. The system of claim 8, wherein the processing unit is further configured to:
perform a page walk;
identify page size indicator information based on the page walk; and
update the PDEC to include a hint bit based on the page size indicator information.

10. The system of claim 9, wherein:
the performing the PDEC lookup includes identifying the hint bit; and
the updating the set of possible page sizes includes removing one or more of the possible page sizes from the set based on the hint bit.

11. The method of claim 10, wherein:
the performing the TLB lookup includes performing a first TLB check with a first page size; and
the processing unit is further configured to determine, based on the hint bit, a correct page size, wherein the first TLB check is performed with the correct page size.

12. The system of claim 8, wherein:
the performing the PDEC lookup includes identifying a level of a returned page directory entry (PDE); and
the updating the set of possible page sizes includes removing one or more of the possible page sizes from the set based on the level.

13. The system of claim 8, wherein the PDEC lookup is performed contemporaneously with the TLB lookup.

14. The system of claim 8, wherein the PDEC lookup is performed before the TLB lookup.

15. A computer program product, the computer program product comprising a computer readable storage medium having program instructions embodied therewith, the program instructions executable by a computer to cause the computer to:
receive a request, the request including a virtual address;
identify a set of possible page sizes;
perform, responsive to the receiving, a Page Directory Entry Cache (PDEC) lookup based on the virtual address;
update, based on the PDEC lookup, the set of possible page sizes; and
perform, responsive to the receiving, a Translation Lookaside Buffer (TLB) lookup based on the virtual address and the updated set of possible page sizes.

16. The computer program product of claim 15, wherein the instructions further cause the computer to:
perform a page walk;
identify page size indicator information based on the page walk; and
update the PDEC to include a hint bit based on the page size indicator information.

17. The computer program product of claim 16, wherein:
the performing the PDEC lookup includes identifying the hint bit; and
the updating the set of possible page sizes includes removing one or more of the possible page sizes from the set based on the hint bit.

18. The computer program product of claim 17, wherein:
the performing the TLB lookup includes performing a first TLB check with a first page size; and
the instructions further cause the computer to determine, based on the hint bit, a correct page size, wherein the first TLB check is performed with the correct page size.

19. The computer program product of claim 15, wherein:
the performing the PDEC lookup includes identifying a level of a returned page directory entry (PDE); and
the updating the set of possible page sizes includes removing one or more of the possible page sizes from the set based on the level.

20. The computer program product of claim 15, wherein the PDEC lookup is performed before the TLB lookup.

* * * * *